June 7, 1960 F. M. DEMER ET AL 2,939,632

RECORD READER

Filed Feb. 4, 1955 3 Sheets-Sheet 1

INVENTORS.
FREDERICK M. DEMER &
RALPH G. MORK
BY
Campbell, Brumbaugh, Free & Graves
Their ATTORNEYS.

RECORD READER

Filed Feb. 4, 1955 3 Sheets-Sheet 2

INVENTORS
FREDERICK M. DEMER &
RALPH G. MORK
BY
Campbell, Brumbaugh, Free & Graves
their ATTORNEYS June 7, 1960 F. M. DEMER ET AL 2,939,632

RECORD READER

Filed Feb. 4, 1955 3 Sheets-Sheet 3

INVENTORS.
FREDERICK M. DEMER &
RALPH G. MORK
BY
Campbell, Brumbaugh, Free & Graves
their ATTORNEYS United States Patent Office 2,939,632

Patented June 7, 1960

2,939,632

RECORD READER

Frederick M. Demer, Johnson City, and Ralph G. Mork, Vestal, N.Y., assignors to International Business Machines Corporation, New York, N.Y., a corporation of New York Filed Feb. 4, 1955, Ser. No. 486,094

18 Claims. (Cl. 235—61.11)

This invention relates to apparatus for reading data bearing records, and has particular reference to such apparatus effective to accurately read rapidly moving data bearing record cards.

One of the functions performed by accounting machines involves reading or obtaining data stored on records such as punched cards. It is evident that the speed and reliability of the reading function determines, to a great extent, the usefulness of such machines. Thus, any increase in the reading rate permits an increase in the number of records that may be accommodated by the machine in a predetermined time interval.

In addition, a reader, to be useful, must be capable of serving in existing systems. To lend itself to such systems, it is necessary that the reader, in obtaining information from records containing data stored at index points arranged in groups, generate reference pulses corresponding to each index point as well as data signals representative of data bearing index points.

Accordingly, it is an object of the present invention to provide apparatus for rapidly and reliably reading records containing data stored at index points arranged in groups.

It is another object of the invention to provide record reading apparatus having the above characteristics which generates reference pulses corresponding to each index point on the records.

It is a further object of the invention to provide a reader for rapidly moving records containing data stored at index points arranged in groups which includes a light storage element cooperating with a synchronized flashing light source.

These and further objects of the invention are accomplished by initially providing an electron discharge tube having its electron beam focused on a light storage target, deflecting means being provided to suitably position the beam. A light source for generating light rays flashes in accordance with the operation of conveyer means. Data bearing records are moved into the path of the light rays by such conveyer means. The resulting images are projected to the target which is scanned by the electron beam to generate signals indicative of data stored on the records. Further means are provided to generate reference pulses representative of the index points on the records.

In one embodiment of the invention, the deflecting means comprises first means for vertically deflecting the electron beam across the target and second means, including a further electron discharge tube, for generating control voltages to shift the electron beam horizontally to selected positions on the target.

In another embodiment of the invention, means for generating control voltages to shift the electron beam horizontally along the target include conductor elements, positioned in front of the target, which receive a portion of the beam.

In a further embodiment of the invention, the reference pulses may be generated by a pulse generator controlled by the deflecting means.

In yet another embodiment of the invention, the reference pulses may be generated by providing conductive strips on the target cooperating with the electron beam.

These and further objects and advantages of the invention will be more readily understood when the following description is read in connection with the accompanying drawings in which.

Figure 1:
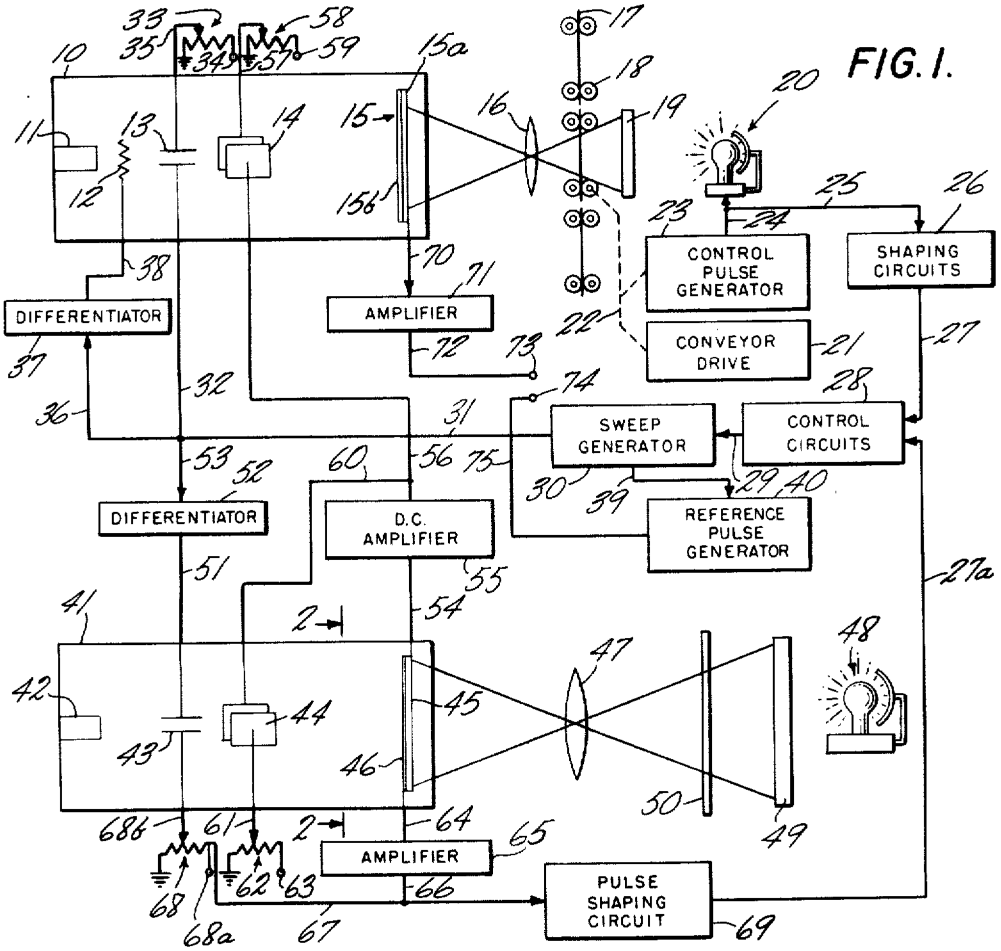
Figure 1 is a schematic diagram in block form illustrating a record reading system constructed in accordance with the principles of the present invention.

Referring to an illustrative embodiment of the invention in greater detail with particular reference to Figure 1, an electron discharge tube 10 includes a conventional electron gun 11, a control or blanking grid 12, vertical and horizontal deflecting plates 13 and 14, respectively, and a light storage screen or target 15. While the tube 10 may comprise any conventional light storage tubes such as an iconoscope, orthicon, or image orthicon, a vidicon tube is described in connection with the present invention. It is well known that light storage tubes conventionally used, other than the vidicon, operate on the photoemission principle. However, the vidicon employs the photoconductive characteristics of certain materials in order to generate signals representative of a light pattern projected on its photosensitive screen or target. Thus, the target 15 is formed by a transparent conductive signal plate **15*a* carrying a layer of photoconductive material 15*b***.

In the present invention, a lens system represented by a single lens 16 focuses light rays passing through conventional data bearing record cards 17, which are moved by conveying mechanism represented by pairs of rollers 18, in front of a light diffusing element 19. Adjacent to the light diffusing element 19 is positioned a light source 20 which may comprise, for example, a neon lamp or arc light, in order to permit the generation of short well defined light flashes.

It will be understood that the conveying mechanism 18 may take any well known form in order to sequentially move the data bearing cards 17 in front of the diffusing element 19, this action permitting the light rays generated by the source 20 to pass through each card 17 to form a pattern representative of stored data on the target 15. Obviously, other lens systems may be employed so that the cards 17 need not be conveyed immediately adjacent to either the element 19, the source 20 or the tube 10. In addition, in the event data is not represented by punched holes but by reflective areas or if it is desirable to project a positive rather than a negative image to the target 15, the light source 20 may be suitably positioned to cause light rays to be reflected to the target 15.

Considering the relation between the light source 20 and the cards 17, a conveyor drive 21 operates the conveyor 18 through any conventional mechanical linkage 22 which also controls the operation of a control pulse generator 23. The conveyor drive 21 is synchronized with the control pulse generator 23 by the linkage 22 so that a pulse will be generated and applied to cable 24 to energize the light source 20 when one of the record cards 17 is suitably positioned in front of the diffuser 19. It will be apparent that a light flash must occur when the resulting image of one of the cards 17 will be projected squarely on the target 15 in a predetermined position.

The light flashes generated by the source 20 in response to pulses from the generator 23 may be of sufficiently short duration to effectively stop the cards 17 in a stroboscopic type action. Thus, the permissible duration of the light pulse from the source 20 is determined by the speed with which the cards 17 are conveyed between the diffusing element 19 and the lens 16.

A cable 25 carries pulses from the pulse generator 23 to shaping circuits 26, and the resulting pulses are supplied through a cable 27 to control cricuits 28. A cable 29 joins the control circuits 28 to a sweep generator 30 supplying saw-tooth pulses through the cables 31 and 32 to the vertical deflecting plates 13 of the tube 10. A zero adjusting network 33 carries a suitable bias terminal 34 and controls the potential on the plates 13 through a conductor 35. Saw-tooth pulses are also furnished to cable 36 leading to a differentiator 37, its output being coupled to the blanking grid 12 through a further cable 38.

Returning to the control circuits 28 and the sweep generator 30, these may comprise conventional circuits which will, upon the reception of a pulse from the cable 27, initiate a supply of saw-tooth pulses to the cable 31. In addition, the circuits 28 respond to a further pulse received from a further input cable **27*a* to deenergize the sweep generator 30 through the connecting cable 29. For example, the control circuits 28 may comprise a bistable multivibrator which, when receiving a pulse from the cable 27, generates an output pulse to initiate operation of the sweep generator 30 and which, upon reception of a suitably shaped pulse on the cable 27*a*, generates a further pulse deenergizing the sweep generator 30**. Obviously, other known circuits may be employed to perform this function.

The output pulses from the sweep generator 30 are also applied through a cable 39 to a reference pulse generator 40, designed to furnish a predetermined number of spaced reference pulses during each saw-tooth pulse. For example, a cathode ray tube may cooperate with a mask, carrying a predetermined number of apertures, and a photosensitive element to generate reference pulses in synchronism with saw-tooth pulses. Obviously, other suitable pulse generators may be employed in the present invention.

It will be evident that the above-described apparatus sweeps the electron beam in the tube 10 vertically across the target 15 when an image of one of the cards 17 is projected thereon through the lens 16. Further apparatus must also be provided to progress the electron beam along the target 15 so that in successive vertical sweeps, it will trace along selected paths representative of selected columns of index points on the cards 17.

In the particular embodiment of the invention shown in Figure 1, a further electron discharge control tube 41, which includes an electron gun 42, vertical and horizontal deflecting plates 43 and 44, respectively, a screen or target 45 similar to the target 15, and a reset member 46, cooperates with other elements, described below, to progress the electron beam in the tube 10 along the target 15 in a predetermined manner. The reset member 46 may comprise a strip of metal foil at the edge of and insulated from the target 45.

Figures 2, 3:
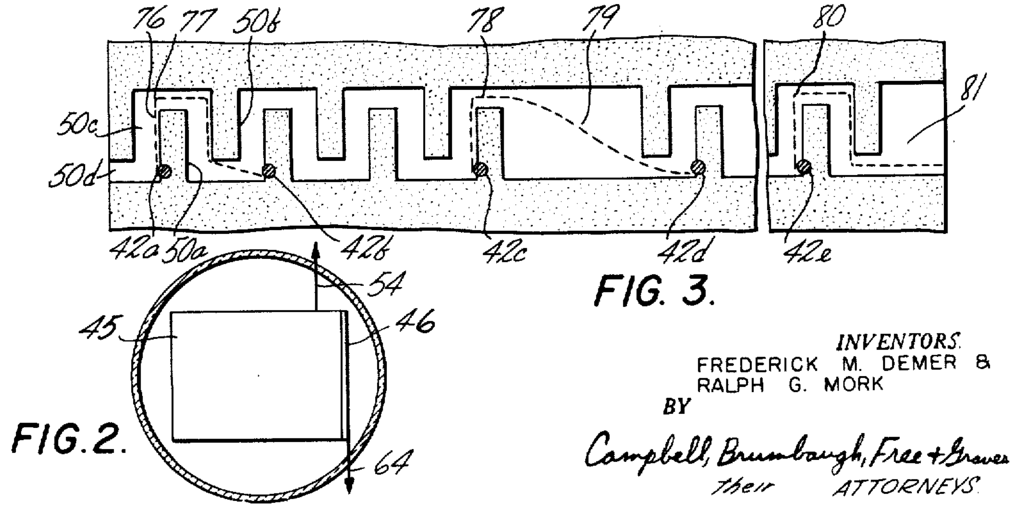
Figure 2 is a transverse section of a control tube shown in Figure 1 taken on the view line 2—2 looking in the direction of the arrows.
Figure 3 is a plan view, greatly enlarged, of an image projected on the target of the control tube shown in Figure 1.

Positioned in front of the tube 41 is a lens system 47 receiving light rays from a light source 48, such rays being diffused by an element 49 before passing through a mask 50. This is formed so that light rays passing therethrough form an image on the target 45 as illustrated in Figure 3. For convenience, only a portion of the image is shown since there may be 80 columns on each card 17 requiring a like number of zones on the mask 50.

The vertical deflecting plate 43 of the tube 41 receives pulses on a cable 51 leading from a differentiator 52 operating on saw-tooth pulses received on a cable 53 from the cable 31. The transparent conductive plate found on the target 45, if a vidicon is employed, is joined by a cable 54 to a D.-C. amplifier 55. A cable 56 couples control voltages from the amplifier 55 to the horizontal deflecting plates 14 of the tube 10, these plates also being joined through cable 57 to a zero adjusting network 58 carrying a bias terminal 59. In addition, a further cable 60 carries the control voltages from the cable 56 to the horizontal deflecting plates 44, these being joined by a conductor 61 to a zero adjusting network 62 provided with a bias terminal 63.

The reset member 46, best shown in Figure 2, furnishes a signal through a cable 64 to an amplifier 65, the output signals therefrom being coupled through cables 66 and 67, a zero adjusting network 68 having a bias terminal **68*a*, and another cable 68*b* to the vertical deflecting plates 43 of the tube 41. In addition, the output signals from the amplifier 65 are furnished through the cable 67 to a pulse shaping circuit 69 supplying signals to the control circuits 28 through the cable 27*a***.

In light storage tubes, the target normally includes a signal plate connected to a suitable amplifier, signals being generated when the electron beam sweeps across a point on the target which has been or is illuminated. Thus, if a vidicon tube 10 is employed, a conductor 70 is joined to the transparent conductive signal plate **15*a* found on the target 15 and leads to an amplifier 71 supplying signals through a cable 72 to an output terminal 73. In addition, a further output terminal 74 receives reference pulses from the reference pulse generator 40 on a cable 75** in order to render the output of the present record reading system usable in a variety of electronic calculating machines.

Before considering the operation of the entire record reading system, it will be helpful to discuss the principles of operation of the control tube 41 and its associated circuits and apparatus. The mask 50 is provided with oppositely directed opaque elements to create the oppositely directed shadows **50*a* and 50*b* on the target 45, as illustrated in Figure 3. Such shadows define an illuminated zone 50*c* along which the electron beam generated by the electron gun 42 is driven. To explain such driving action, it will be assumed that the electron beam impinges on an area 42*a* on the left side of the illuminated zone 50*c*, as shown in Figure 3. It will be noted that a portion of the beam impinges on illuminated area 50*c* while the remaining portion is received by one of the shadows 50*a*. This results in a condition of equilibrium, i.e., the control voltage generated by the target 45, in response to the portion of the beam impinging on the illuminated area 50*c*, is amplified by the D.-C. amplifier 55 and applied through the cables 56 and 60 to the horizontal deflecting plates 44. However, if a greater percentage of the electron beam impinges on the area 50*c*, the voltage amplified by the D.-C. amplifier 55 and applied to the deflecting plates 44 will tend to move the electron beam to the right in Figure 3. On the other hand, if a lesser percentage of the electron beam impinges on the area 50*c*, when, for example, the electron beam rests entirely on one of the shadows 50*a*, the signal generated by the target 46 will move the beam towards the left in Figure 3. It will be understood that for greatest sensitivity in this servo-type arrangement, the D.-C. amplifier 55** should have a high gain characteristic.

Examining the above action in greater detail, the amplifier 55 and the zero adjusting network 62 may be set to hold the electron beam of the tube 41 at the middle of the illuminated zone 50*c* when it receives 30 percent of the electron beam. With these conditions, the voltage required on the deflecting plates 44 to maintain the electron beam at the left side of the area 50*c* may be generated by the target 45 in response to 10 percent of the electron beam, such as shown at 42*a* in Figure 3, while the voltage required to stabilize the electron beam at the right side of the zone 50*c* may be generated by the target 45 in response to 50 percent of the electron beam impinging on the illuminated area 50*c*. It will be understood that these are exemplary values only and are not to be construed as limiting the invention in any manner.

With the above principles in mind, the function of the control tube 41 will be readily understood. With the electron beam impinging on the area 42*a* on the left of the illuminated zone 50*c*, as shown in Figure 3, a suitable pulse applied to the vertical deflecting plates 43 will drive the electron beam upwardly, as indicated by a broken line 76, to a position 77 where the electron beam will impinge only on the illuminated area 50*c*. Therefore, it will be rapidly driven to the right and returned to an area 42*b* with the trailing edge of the pulse applied to the vertical deflecting plates 43. It should be noted that a greater percentage of the electron beam will impinge on the illuminated area 50*c* at the new position where the electron beam defines an area 42*b*. The control voltages generated in this operation are applied through the cable 56 to the horizontal deflecting plates 14 of the tube 10 to deflect the electron beam generated by the gun 11 along the target 15.

Another feature of the present invention resides in the fact that paths representative of selected columns of index points on the cards 17 may be scanned while other paths representative of other columns on the cards 17 may be skipped. Thus, referring again to Figure 3 and assuming that the electron beam in the tube 41 has progressed so that it rests on an area 42*c*, a pulse on the vertical plates 43 deflecting the beam upwardly to a point 78 results in the beam being driven by the generated control voltages through an area 79, in the illuminated area 50*c* to a new position where the beam impinges on an area 42*d*. The area 79 is produced by removing several of the opaque elements defining shadows 50*a* and 50*b*. Of course, the control voltages generated in this operation, when applied to the horizontal deflecting plates 14 of the tube 10, skip the electron beam generated by the gun 11 over a predetermined number of paths representative of columns of index points on the cards 17 to the next selected path representative of a selected column. In this manner, any desired number of paths representative of columns of index points on the cards 17 may be skipped in the scan pattern.

With these principles in mind, the following discussion of a typical operation of the reading system will be more readily understood. As each of the data bearing record cards 17 which are being conveyed between the diffusing element 19 and the lens 16 reaches a selected position, the control pulse generator 23 supplies a pulse to the light source 20 which flashes and projects an image of the card 17 on the target 15. This pulse is also applied through the cable 25 to the shaping circuits 26, the resultant shaped pulse being coupled through the cable 27 to trigger the control circuits 28. This initiates operation of the sweep generator 30 and accordingly, the electron beam generated by the gun 11 in the tube 10 scans the first selected path representative of a column of index points on one of the cards 17.

Simultaneously with the above scan, reference pulses are generated by the pulse generator 40 and supplied to the output terminal 74, one pulse being generated each time the beam crosses a point on the target 15 representative of an index point found in a selected column on one of the cards 17. Thus, assuming the presence of a punched hole in the first column of the card 17 whose image has been projected on the target 15 by the light flash, when the beam encounters an illuminated area representing the hole, a signal is generated and fed by the cable 70, the amplifier 71 and the cable 72 to the output terminal 73. As stated above, a reference pulse will appear at the terminal 74 simultaneously with the signal at the terminal 73 indicative of data on the card 17.

At the end of the first vertical sweep, the saw-tooth pulse quickly returns to its reference level. Its rapidly negative going portion, when applied to the differentiator 37 through the cable 36, results in a negative pulse which, when applied to the blanking grid 12, cuts off the electron beam to prevent the generation of spurious signals by the target 15 during the retrace interval. In addition, this sharply negative going portion of the saw-tooth pulse, when supplied through the cable 53 to the differentiator 52, results in the application of a pulse to the vertical plates 43 of the tube 41, and this pulse deflects the electron beam so that it progresses from the area 42*a* to the area 42*b*, as explained above in connection with Figure 3. The resultant control voltages are furnished through the cable 56 to the horizontal deflecting plates 14 of the tube 10 to shift the electron beam into alignment with a path representative of the next selected column of index points on one of the cards 17.

It will be understood that the light source 20 flashes for intervals of sufficiently short duration to preclude excessive movement of the image of the card 17 on the target 15. Obviously, a small amount of movement will not interfere with accurate reading.

After the electron beam in the tube 10 has scanned all of the paths representative of selected columns of index points, it will be positioned at an area 42*e* (Figure 3) on the right hand side of the illuminated zone 50*c*. The negative going portion from a saw-tooth pulse will result in a pulse on the vertical plates 43 to deflect the electron beam upwardly to a point 80 and then downwardly to a further illuminated area 81 which leads to the reset number 46. When the electron beam impinges on the metal strip 46 on the right hand edge of the target 45, a pulse will be applied through the cable 64 to the amplifier 65 and the resulting amplified pulse coupled through the cables 66 and 67, the zero adjusting network 68 and the cable 68*b* to the deflecting plates 43. This will drive the electron beam generated by the gun 42 well below the illuminated zone 50*c*. The resulting control voltage will deflect the beam to the left side of the target 45. Upon the subsidence of the pulse from the amplifier 65, the beam will rise and encounter the leftwardly extending illuminated zone 50*d* causing it to return to the area 42*a*. Of course, other means may be provided for retracing the beams in the tubes 10 and 12. For example, a reset member may be located in the tube 10 rather than the tube 41.

It will be understood that a pulse generator, such as a monostable multivibrator commonly termed a one-shot multivibrator, may be triggered by the pulse from the reset member 46 to provide a pulse having a duration sufficient to permit the beam to return to the left hand side of the target 45. If such a circuit is not provided, the time constant in the output of the amplifier 65 should be great enough to permit the beam to retrace to the left hand side of the target 45 before it returns to the zone 50*c*.

The pulse from the reset member 46 is also applied to the pulse shaping circuit 69 and the resultant pulse coupled through the cable 27*a*. This serves to actuate the control circuits 28 which will deenergize the sweep generator 30.

Of course, with the electron beam generated by the gun 42 being swept to the left side of the target 45, the control voltage on the cable 56 will also drive the electron beam generated by the gun 11 in the tube 10 to its initial left hand position. Accordingly, the system is prepared to receive a further pulse from the control pulse generator 23, and this pulse will be generated when another of the record cards 17 is suitably positioned between the diffusing element 19 and the lens 16.

It will be understood that the position of the beam in the tube 10 may be determined by control means other than the tube 41. For example, instead of employing the control tube 41, the cathode ray tube control arrangement described in our above-mentioned copending application Serial No. 524,874, filed July 28, 1955, may be utilized in the present system.

Figures 4, 5:
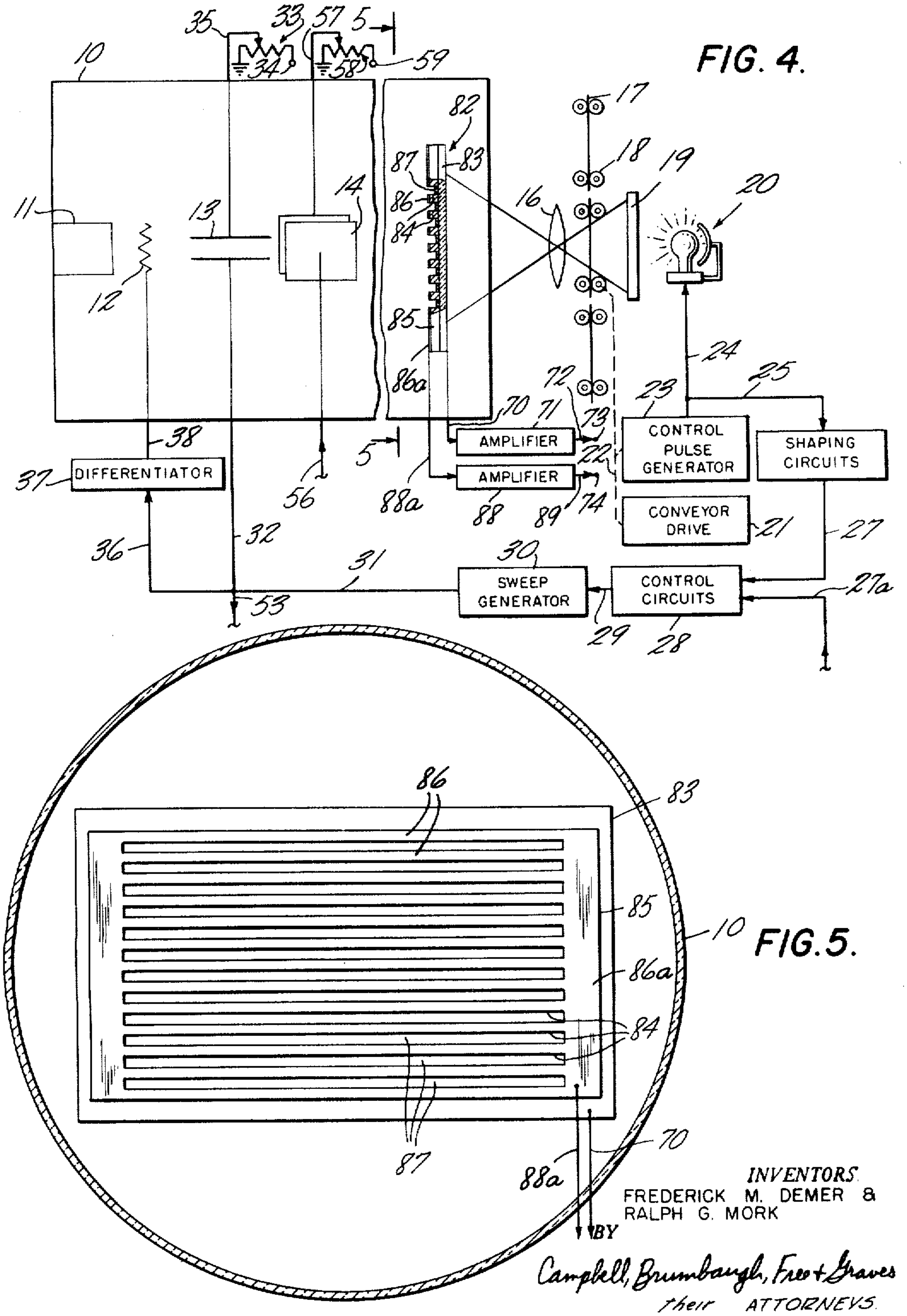
Figure 4 is a schematic diagram in block form of a modified record reader in accordance with the present invention.
Figure 5 is a transverse section, somewhat enlarged, of a reading tube shown in Figure 4 taken on the view line 5—5 looking in the direction of the arrows.

A modified form of record reading system is illustrated in Figure 4. In this embodiment of the invention, elements similar to those found in Figure 1 are designated by like reference numerals. This system differs from that shown in Figure 1 in that the reference pulse generator 40 may be omitted in favor of generating pulses directly in the storage tube 10.

Examining Figures 4 and 5 in more detail, a target 82 is positioned to receive an electron beam generated by the gun 11 and an image of one of the cards 17 as it passes between the diffuser 19 and the lens 16. However, in this instance the target 82 consists of a transparent conductive signal plate 83 mounting vertically spaced horizontally oriented insulator bars 84 terminated by vertical insulating bars 85. The top portions of the horizontal bars 84 and the vertical bars 85 are covered with connected conductive metal foil strips 86 and **86*a*, respectively. Disposed between the bars 84 on the transparent signal plate 83 are strips 87 composed of a photoconductive material, if a vidicon tube is employed. The cable 70 is joined to the signal plate 83 for receiving data signals, as discussed in connection with Figure 1, and a cable 88*a* carries pulses from the coil 86*a* to an amplifier 88 whose output is coupled to the terminal 74 through a cable 89**.

Obviously, the above-described target structure may be adapted to photoemission type light storage tubes such as the iconoscope and orthicon, if suitably mosaic strips are substituted for the photoconductive strips 87.

The operation of this embodiment of the invention is similar to that described in connection with Figure 1. However, instead of generating reference pulses by the separate generator 40 as in Figure 1, the electron beam generated by the gun 11 will, in scanning the target 82, alternately encounter conductive foil strips 86 and photoconductive strips 87. If the signal level on the cable **88*a* when the beam from the gun 11 impinges on the conductive portion 86 is considered a reference level, signal variations from such reference level may be considered reference pulses. Such variations will occur when the beam leaves the foil strips 86 and passes over the photoconductive strips 87. Thus, the reference pulses are generated in exact synchronism with the scan of the beam over the photoconductive strips 87 which, of course, receive images of punched holes on the cards 17. Obviously, the pulses generated while the beam passes over the foil strips 86** may also be considered reference pulses and suitable allowance made for their displacement in time from pulses indicative of data.

Figures 6, 7:
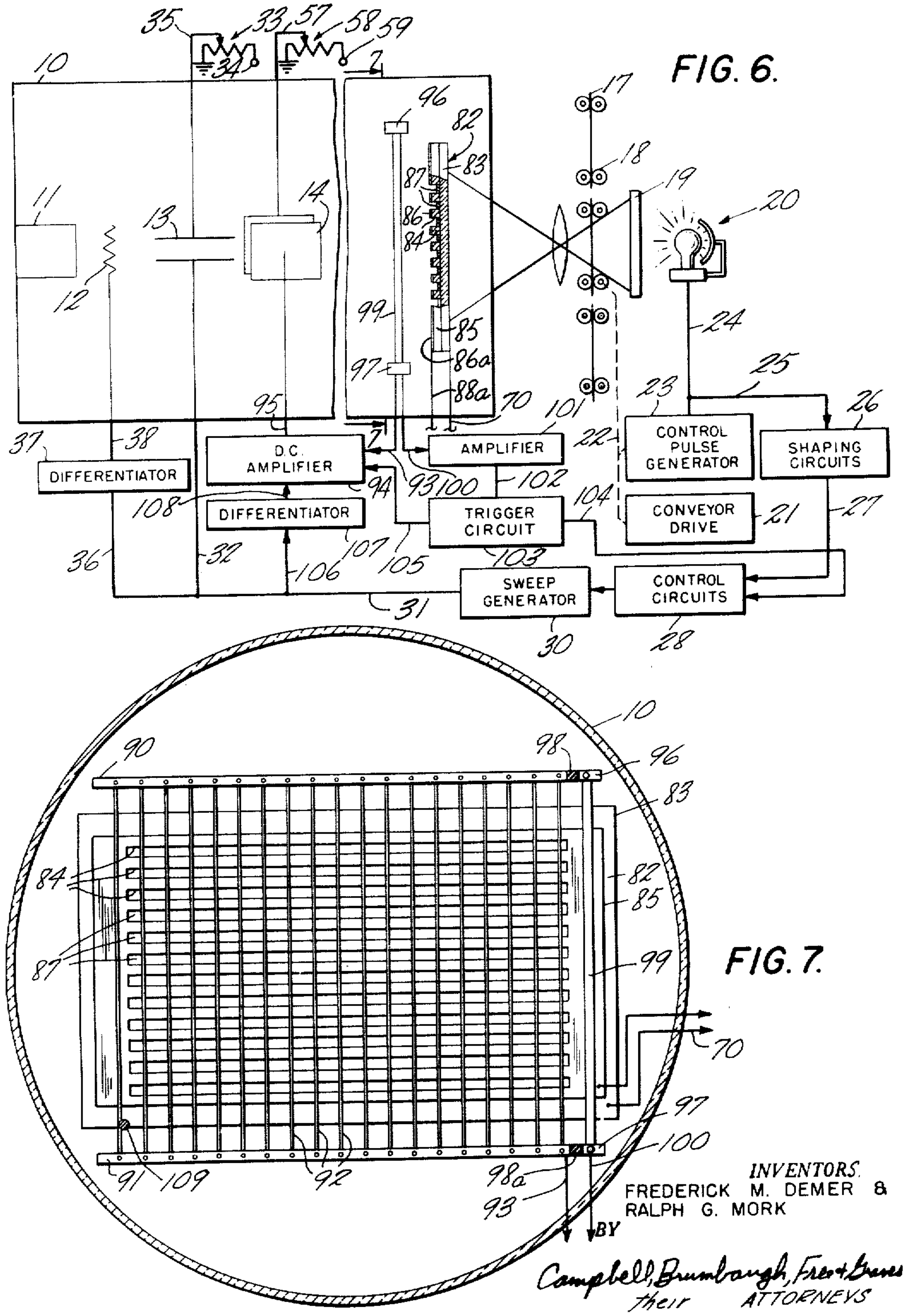
Figure 6 is a schematic diagram in block form of another modified record reading system in accordance with the invention.
Figure 7 is a transverse section, somewhat enlarged, of a reading tube illustrated in Figure 6 taken on the view line 7—7 looking in the direction of the arrows.

Turning to a further modification of the reading system illustrated in Figure 6 wherein elements similar to those found in Figures 1 and 4, are designated by like reference numerals, this system is arranged to eliminate the control tube 41 and substitute therefor an element in the reading tube 10.

Examining Figures 6 and 7 in greater detail, a pair of horizontally oriented metal rods 90 and 91 support a plurality of spaced vertical conductors 92 forming a control grid in front of the target 82. As shown in Figure 7, the rod 91 is joined by a cable 93 to a D.-C. amplifier 94 having its output terminals connected through a cable 95 to the horizontal deflecting plates 14.

In addition to the grid formed by the conductors 92, a further pair of metal rods 96 and 97 are joined by insulating blocks 98 and 99 to the rods 90 and 91, respectively. A metal strip 99 is connected between the rods 96 and 97, a cable 100 joining it to an amplifier 101 which is joined by another cable 102 to a trigger circuit 103. The output signals from the trigger circuit 103 are supplied by a cable 104 to the control circuits 28 and by a cable 105 to the D.-C. amplifier 94.

A cable 106 furnishes saw-tooth pulses from the cable 91 to a differentiator 107, the resultant pulses generated in response to the sharply negative going portions of the saw-tooth pulses being coupled through the amplifier 94 to the horizontal deflecting plates 14. The cables 93 and 108 lead to the same input terminals of the amplifier 94, the showing in Figure 6 being in the interests of clarity.

The operation of this embodiment of the invention is similar to that described in connection with Figures 1 and 4. The position of the electron beam generated by the gun 11 is adjusted by the network 58 to impinge on a spot to the left of the image of one of the cards 17 when the D.-C. amplifier 94 is inoperative. The amplifier 94 is connected to the plates 14 with such polarity that when energized, it drives the beam to the right to cause it to encounter the first of the conductors 92. As a result, a control voltage will be generated on the rod 91 and applied through the conductor 93, the amplifier 94 and the cable 95 to the deflecting plates 14 to stabilize the beam by a servo action at a point 109, as shown in Figure 7. Thus, part of the beam will be absorbed by the wire 92 and the remainder will continue on to the target 82. It will be obvious that the portion of the beam remaining for target scanning is proportional to the gain of the amplifier 94. Therefore, it is advantageous to use a high gain amplifier in this circuit.

With the beam positioned as shown in Figure 7, a saw-tooth pulse applied to the vertical deflecting plates 13 will cause it to scan a path representative of one column of index points on one of the cards 17. At the end of the scan, the sharply negative going portion of the saw-tooth pulse will be applied to the differentiator 107 through the cable 106 and the resultant pulse on the cable 108 will step the electron beam approximately one space to the right whereby its control will be taken over by the next conductor 92. Of course, while the beam is scanning the target 82, reference pulses will be supplied to the cable **88*a***, as explained in connection with Figure 4.

When the beam has been stepped to the last control wire 92, and swept across the target 82 by a saw-tooth pulse, the next differentiated pulse applied to the D.-C. amplifier 49 will cause the beam to step to the strip 99. This results in the generation of a pulse on the cable 100 which, when amplified in the amplifier 101, excites the trigger circuit 103. This results in a pulse on the cable 104 which functions to actuate the control circuits 28 to deenergize the sweep generator 30. A pulse is also applied to the cable 105 to deenergize the D.-C. amplifier 94 for a period determined by the duration of the pulse. As explained above, deenergization of the amplifier 94 causes the beam generated by the gun 11 to return to a position on the left side of the target 82 and therefore, control of the beam is again taken over by the left hand wire 92 upon subsequent energization of the amplifier 94. It will be apparent that the beam may be deflected back to the left of the target 82 by other means such as an independent retrace pulse generator.

Although the invention has been described with reference to record cards, it will be apparent that other data storage records may be used within the scope of the invention. Further, it will be understood that the above-described embodiments of the invention are illustrative only and modifications thereof will occur to those skilled in the art. Therefore, the invention is not to be limited to the specific apparatus disclosed herein but is to be defined by the appended claims.

We claim:

1. In apparatus for reading records containing data stored at index points arranged in groups, means for focusing an electron beam on a light storage target, means for sequentially and uninterruptedly conveying the data bearing records along a path, means for producing flashes of light rays synchronized with said conveying means and directed toward said path, means for projecting an image of each of said records formed by one of the light flashes to the target to provide a pattern on the target representative of the data stored on each of the records, first deflecting means for repeatedly sweeping the electron beam across the patterns and along selected paths on the target representative of selected groups of index points on each of said records to generate signals indicative of the data stored on said records, means for generating reference pulses in accordance with the operation of said first deflecting means, and second deflecting means for moving said electron beam after each sweep of one selected path into alignment with another selected path on the target.

2. Apparatus as defined in claim 1 wherein said first deflecting means is energized in accordance with the operation of said conveying means.

3. In apparatus for reading records containing data stored at index points arranged in groups, means for focusing an electron beam on a light storage target, the target including horizontally oriented vertically spaced photosensitive strips disposed on a signal plate and horizontally oriented vertically spaced conductive strips disposed adjacent to and insulated from the signal plate, the photosensitive strips and the conductive strips alternating vertically along the target, means for sequentially conveying the data bearing records along a path, means for producing flashes of light rays synchronized with said conveying means and directed toward said path, means for projecting an image of each of said records formed by one of the light flashes to the target to provide a pattern on the target representative of the data stored on each of the records, means for deflecting the electron beam across the patterns and along vertical paths on the target representative of selected groups of index points on each of said records, first output means connected to the signal plate for receiving signals indicative of the data stored on said records, and second output means connected to said conductive strips for receiving reference pulses.

4. Apparatus as defined in claim 3 wherein the photosensitive strips comprise photoconductive material for receiving said electron beam and the signal plate comprises transparent conductive material for receiving the images.

5. In apparatus for reading records containing data stored at index points arranged in groups, means for focusing an electron beam on a light storage target, the target including horizontally oriented vertically spaced photosensitive strips disposed on a signal plate and horizontally oriented vertically spaced conductive strips disposed adjacent to and insulated from the signal plate, the photosensitive strips and the conductive strips alternating vertically along the target, means for sequentially conveying the data bearing records along a path, means for producing flashes of light rays synchronized with said conveying means and directed toward said path, means for projecting an image of each of said records formed by one of the light flashes to the target to provide a pattern on the target representative of the data stored on each of the records, first deflecting means for repeatedly sweeping the electron beam across the patterns and along vertical paths on the target representative of selected groups of index points on each of said records, said first deflecting means being energized in accordance with the operation of the said conveying means, second deflecting means for moving said electron beam after each sweep of one selected path into alignment with another selected path on the target, first output means connected to the signal plate for receiving signals indicative of the data stored on said records, and second output means connected to the conductive strips for receiving reference pulses.

6. Apparatus as defined in claim 5 in which means are provided for generating and applying a retrace voltage to said second deflecting means to return the electron beam to an initial position after it has been moved from alignment with the last selected path on the target.

7. Apparatus as defined in claim 6 in which means are provided to deenergize said first deflecting means in response to generation of said retrace voltage.

8. Apparatus as defined in claim 7 wherein the photosensitive strips comprise photoconductive material for receiving the electron beam and the signal plate comprises transparent conductive material for receiving the images.

9. In an electron discharge tube, a light storage target including horizontally oriented vertically spaced photosensitive strips disposed on a signal plate and horizontally oriented vertically spaced conductive strips disposed adjacent to and insulated from the signal plate, the photosensitive strips and the conductive strips alternating vertically along the target.

10. Apparatus as defined in claim 9 wherein the photosensitive strips comprise photoconductive material and the signal plate comprises transparent conductive material.

11. In apparatus for reading records containing data stored at index points arranged in groups, means for focusing an electron beam on a light storage target, means for sequentially conveying the data bearing records along a path, means for producing flashes of light rays synchronized with said conveying means and directed toward said path, means for projecting an image of each of said records formed by one of the light flashes to the target to provide a pattern on the target representative of the data stored on each of the records, vertical deflecting means for repeatedly sweeping the electron beam across the patterns and along selected paths on the target representative of selected groups of index points on each of said records to generate signals indicative of the data stored on said records, said vertical deflecting means being energized in accordance with the operation of said conveying means, a plurality of vertically oriented horizontally spaced conductors between the target and the electron beam focusing means, said conductors providing control voltages in response to the impingement of said electron beam thereon, horizontal deflecting means for said electron beam, means for applying said control voltages to said horizontal deflecting means to stabilize the beam position when a portion thereof impinges on one of said conductors, and means for stepping said beam from one conductor to an adjacent conductor after each vertical sweep of the electron beam across the target.

12. Apparatus as defined in claim 11 in which means are provided for generating and applying a retrace voltage to the horizontal deflecting means to return the electron beam to an initial position after it has been stepped from the last conductor.

13. In apparatus for reading records containing data stored at index points arranged in groups, means for focusing an electron beam on a light storage target, the target including horizontally oriented vertically spaced photosensitive strips disposed on a signal plate and horizontally oriented vertically spaced conductive strips disposed adjacent to and insulated from the signal plate, the photosensitive strips and the conductive strips alternating vertically along the target, means for sequentially conveying the data bearing records along a path, means for producing flashes of light rays synchronized with said conveying means and directed toward said path, means for projecting an image of each of said records formed by one of the light flashes to the target to provide a pattern on the target representative of the data stored on each of the records, vertical deflecting means for repeatedly sweeping the electron beam across the patterns and along selected paths on the target representative of selected groups of index points on each of said records to generate signals indicative of the data stored on said records, said vertical deflecting means being energized in accordance with the operation of said conveying means, a plurality of vertically oriented horizontally spaced conductors between the target and the electron beam focusing means, said conductors providing control voltages in response to the impingement of said electron beam thereon, horizontal deflecting means for said electron beam, means for applying said control voltages to said horizontal deflecting means to stabilize the beam position when a portion thereof impinges on one of said conductors, and means for stepping said beam from one conductor to an adjacent conductor after each vertical sweep of the electron beam across the target.

14. Apparatus as defined in claim 13 in which means are provided for generating and applying a retrace voltage to the horizontal deflecting means to return the electron beam to an initial position after it has been stepped from the last conductor.

15. Apparatus as defined in claim 14 wherein said return means comprises a vertically oriented reset conductor horizontally spaced from said last conductor and circuit means responsive to signals from said reset conductor for producing said retrace voltage.

16. Apparatus as defined in claim 15 wherein the photosensitive strips comprise a photoconductive material for receiving said electron beam and the signal plate comprises transparent conductive material for receiving the images.

17. In an electron discharge tube, means for focusing an electron beam on a light storage target, the target including horizontally oriented vertically spaced photosensitive strips disposed on a signal plate and horizontally oriented vertically spaced conductive strips disposed adjacent to and insulated from the signal plate, the photosensitive strips and the conductive strips alternating vertically along the target, and a plurality of vertically oriented horizontally spaced conductors between the target and the electron beam focusing means.

18. Apparatus as defined in claim 17 wherein the photosensitive strips comprise photoconductive material and the signal plate comprises transparent conductive material.

References Cited in the file of this patent

UNITED STATES PATENTS

| | | |
|---|---|---|
| 2,712,898 | Knutsen | July 12, 1955 |
| 2,731,200 | Koelsch | Jan. 17, 1956 |